United States Patent
Hampel et al.

(10) Patent No.: US 8,273,808 B2
(45) Date of Patent: Sep. 25, 2012

(54) DISPERSING AGENTS FOR GYPSUM PLASTER COMPOSITIONS

(75) Inventors: Christina Hampel, Oberengstringen (CH); Ueli Sulser, Unterengstringen (CH); Jabbar Al Shemari, Zurich (CH); Jorg Zimmermann, Zurich (CH)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 13/056,495

(22) PCT Filed: Jul. 30, 2009

(86) PCT No.: PCT/EP2009/059871
§ 371 (c)(1),
(2), (4) Date: Jan. 28, 2011

(87) PCT Pub. No.: WO2010/012804
PCT Pub. Date: Feb. 4, 2010

(65) Prior Publication Data
US 2011/0160351 A1 Jun. 30, 2011

(30) Foreign Application Priority Data
Jul. 30, 2008 (EP) .................... 08161423

(51) Int. Cl.
*C08K 3/00* (2006.01)
*C08K 3/10* (2006.01)
(52) U.S. Cl. ........................... 524/5; 524/436
(58) Field of Classification Search .............. 524/5
See application file for complete search history.

(56) References Cited

U.S. PATENT DOCUMENTS

| 6,264,739 B1 | 7/2001 | Yamato et al. |
| 6,846,882 B2 | 1/2005 | Büchner et al. |
| 7,261,772 B1 | 8/2007 | Schwartz et al. |
| 2004/0266932 A1* | 12/2004 | Mosquet et al. ........... 524/436 |
| 2006/0004148 A1* | 1/2006 | Sulser et al. ............. 525/329.7 |
| 2006/0280970 A1 | 12/2006 | Lettkeman et al. |
| 2007/0181041 A1 | 8/2007 | Kanazawa et al. |
| 2008/0021169 A1 | 1/2008 | Sulser et al. |
| 2008/0119602 A1* | 5/2008 | Sulser et al. .............. 524/502 |

FOREIGN PATENT DOCUMENTS

| DE | 100 15 135 A1 | 10/2001 |
| EP | 1 061 089 A1 | 12/2000 |
| EP | 1 138 697 A1 | 10/2001 |
| EP | 1 348 729 A1 | 10/2003 |
| EP | 2 006 258 A1 | 12/2008 |
| FI | 2 827 593 A1 | 1/2003 |
| GB | 2 319 522 A | 5/1998 |
| WO | WO 95/09821 A2 | 4/1995 |
| WO | WO 97/35814 A1 | 10/1997 |
| WO | WO 02/081400 AI | 10/2002 |
| WO | WO 2005/090416 A1 | 9/2005 |

OTHER PUBLICATIONS

Feb. 18, 2011 International Preliminary Report on Patentability and Written Opinion (IPRP) issued in Application No. PCT/EP2009/059871.
International Search Report issued in Application No. PCT/EP2009/059871 dated Nov. 9, 2009 (with English-language translation).

* cited by examiner

*Primary Examiner* — Hui Chin
(74) *Attorney, Agent, or Firm* — Oliff & Berridge, PLC

(57) ABSTRACT

A polymer P as a dispersant for gypsum compositions, as well as gypsum compositions including the polymer P. The polymer P includes at least one acid unit and at least one long side chain with a molecular weight of at least 1800 g/mol, including polyoxyalkylene groups, and has an acid content of 1.5 to 4 acid groups per gram of polymer.

19 Claims, No Drawings

DISPERSING AGENTS FOR GYPSUM PLASTER COMPOSITIONS

TECHNICAL FIELD

The present invention relates to the field of gypsum compositions, in particular dispersants for gypsum compositions.

STATE OF THE ART

Polymers derived from α,β-unsaturated carboxylic acids with polyalkylene glycol side chains have been already used for a long time in concrete technology as dispersants, in particular as plasticizers, because of the considerable water reduction they provide. These polymers have a comb polymer structure. There is a series of such comb polymers which, besides ester and carboxylic acid groups, also have amide groups.

It has now been shown that the concrete dispersants known in the prior art can only be used to a limited extent for gypsum compositions. The prior-art concrete dispersants in gypsum achieve only a relatively small plasticizing effect and must therefore be used in high dosages, or they have such a strong retarding effect that the gypsum composition hardly even sets.

Up to now, for example, melamine sulfonic acid/formaldehyde condensates have been used as gypsum plasticizers. These plasticizers, however, are environmentally unfriendly because of the liberation of toxic formaldehyde and hence are undesirable. Other prior-art gypsum plasticizers are based on lignin or naphthalene sulfonates such as, for example, those described in WO02081400A1. Such plasticizers have the disadvantage that they discolor the gypsum compositions prepared with them.

In particular, dispersants in gypsum compositions for manufacture of gypsum plasterboard panels require certain properties which are not achieved with conventional gypsum dispersants.

DESCRIPTION OF THE INVENTION

Therefore the aim of the present invention is to provide dispersants which overcome the disadvantages of the prior art, and which are suitable for achieving a sufficient plasticizing effect in the gypsum compositions, in particular for manufacture of gypsum plasterboard, without too much retardation.

It has now been surprisingly discovered that this aim can be achieved by using a polymer P as specified in claim 1. It could surprisingly be established that with polymers having long side chains with a molecular weight of at least 1800 g/mol and an acid content of 1.5 to 4, preferably 1.7 to 3.5 mmol acid groups per gram of polymer, an especially good plasticizing effect can be achieved in gypsum compositions. It has furthermore been shown that these polymers can be used for water reduction in gypsum compositions and that they do not retard setting very much. Likewise the compositions might not be discolored with these polymers.

The invention additionally comprises the use of gypsum compositions including at least one polymer P and preferably calcium sulfate β-hemihydrate for manufacture of gypsum plasterboard panels. Further advantageous embodiments of the invention follow from the subclaims.

EMBODIMENTS OF THE INVENTION

The present invention relates to the use of a polymer P as a dispersant for gypsum compositions, in particular for manufacture of gypsum plasterboard panels.

The dispersant can in particular be used as a plasticizer, as a water reducer, or to improve the workability and flowability of the gypsum compositions manufactured using it. Such gypsum compositions are especially suitable for manufacture of gypsum plasterboard panels. "Gypsum plasterboard panels" means, for example, gypsum cardboard panels, in which a gypsum core is sandwiched between two cardboard panels; gypsum fiberboard panels, which additionally contain fibers; and gypsum drywall panels, which are usually in precast form.

Especially preferred are gypsum compositions according to the invention for gypsum cardboard panels, in which a gypsum core including or consisting of calcium sulfate β-hemihydrate and at least one polymer P is sandwiched between cardboard panels.

In another especially preferred use, the polymer P is used as a plasticizer for such gypsum compositions.

"Gypsum composition" means a composition containing at least 30 wt. %, preferably at least 50 wt. %, even more preferably at least 70 wt. %, or 100 wt % gypsum, relative to the total weight of the binder. In a preferred application, the gypsum composition is cement-free. "Gypsum compositions" mean in particular compositions which contain mainly sulfate binders.

The term "gypsum" refers to any known form of gypsum, in particular calcium sulfate dihydrate, calcium sulfate α-hemihydrate, calcium sulfate β-hemihydrate, or calcium sulfate anhydrite or mixtures thereof.

In a preferred embodiment, gypsum is calcium sulfate β-hemihydrate and the gypsum compositions based on calcium sulfate β-hemihydrate are used for manufacture of gypsum plasterboard panels. The gypsum composition preferably includes at least 70 wt. % calcium sulfate β-hemihydrate, even more preferably at least 90 wt. % calcium sulfate β-hemihydrate, relative to the total weight of the binder.

The term "binder" includes, besides gypsum, other hydraulic-setting materials such as, for example, cement, in particular Portland cement or high-alumina cement and respectively their mixtures with fly ash, silica fume, slag, granulated slag, and limestone filler or quicklime.

The polymer P, which according to the invention is especially suitable for use as a dispersant, in particular as a plasticizer, for gypsum compositions, includes a) a main chain containing hydrocarbon groups, b) at least one side chain including at least one acid group, selected from the group consisting of a carboxylic acid group, a sulfonic acid group, a phosphonic acid group, a phosphoric acid group, or a salt thereof, and c) at least one side chain with molecular weight $M_w$ of at least 1800 g/mol, including at least one polyoxyalkylene group, where the polyoxyalkylene group is connected to the main chain through a linkage including at least one ester, amide, or imide group, preferably at least one ester or amide group;

where the acid content of polymer P is 1.5 to 4, preferably 1.7 to 3.5, even more preferably 1.8 to 2.7 mmol acid groups per gram of polymer.

"Molecular weight" in terms of the invention means the weight-average molecular weight $M_w$.

In this entire document, "(meth)acrylic acid" means both acrylic acid and methacrylic acid or mixtures thereof.

The term "main chain containing hydrocarbon groups" means a compound which contains carbon atoms and hydrogen atoms. The hydrocarbon groups can be saturated or unsaturated, and can contain or consist of aliphatic, aromatic, arylalkyl, alkylaryl, linear or branched groups. This main chain containing hydrocarbon groups can be synthesized, for example, by means of free-radical polymerization and therefore, depending on the initiator system and optional molecular weight controller used, can contain one or more hetero atoms such as, for example, S, O, N, P at the ends of the chain or in the chain.

The main chain can be constructed from identical or different hydrocarbon groups or hydrocarbon units that can be arranged in an alternating, block, or random manner. Examples of a main chain containing hydrocarbon groups are hydrocarbon chains such as are formed, for example, by polymerization of (meth)acrylic acid or derivatives thereof or by copolymerization of acrylic acid with methacrylic acid or derivatives thereof or by copolymerization of maleic acid or derivatives thereof with vinyl or allyl compounds, if the side chains that are not purely hydrocarbon groups, for example, acid, ester, ether, or amide groups, are removed from the chain. Most preferred is a hydrocarbon chain formed by polymerization of acrylic acid.

The term "side chain including at least one acid group or a salt thereof" means a compound which contains at least one carboxylic acid group, sulfonic acid group, phosphonic acid group, phosphoric acid group, or a salt thereof. The acid groups can be completely unneutralized, partially neutralized, or completely neutralized and can be present as a salt or anhydride. The acid group is preferably a carboxylic acid group.

The side chain with a molecular weight $M_w$ of at least 1800 g/mol includes at least one polyoxyalkylene group. The polyoxyalkylene group is preferably connected to the main chain through a linkage which includes at least one ester, amide, or imide group. The molecular weight of the at least one side chain including at least one polyoxyalkylene group is at least 1800 g/mol, preferably 2000 g/mol, even more preferably 3000 g/mol.

The linkage includes at least one ester, amide, or imide group, preferably an ester or amide group, preferably selected from the group consisting of —COO—, —CO—NH—, —R'—COO—, and R—CO—NH—, where R' each independently stands for a $C_1$-$C_6$ alkylene radical.

The polymer P can include different side chains which include at least one polyoxyalkylene group, and which are connected to the main chain through different linkages. For example, the polymer P can include side chains which are connected to the main chain through an ester, amide, or imide group or mixtures thereof. Therefore mixed ester, amide, or imide linkages can appear in a polymer P. For example, for a polymer P, one portion of the side chains including at least one polyoxyalkylene group can be connected to the main chain through an ester group and another portion of the side chains including at least one polyoxyalkylene group can be connected to the main chain through an amide group.

The polyoxyalkylene group contains or consists of preferably polyoxyethylene groups, polyoxypropylene groups, or mixtures of oxyethylene and oxypropylene groups.

In order to achieve the effect according to the invention, the polymer P must contain at least one long side chain with a molecular weight $M_w$ of at least 1800 g/mol as well as a certain acid content (AC) of 1.5 to 4, preferably 1.7 to 3.5, even more preferably 1.8 to 2.7 mmol acid groups per gram of polymer. The acid content of polymer P is given by the sum of the free acid groups and their salts in mmol contained in one gram of polymer P. "Acid groups" means all groups containing an acid or salt thereof. The acid group can also be partially or completely neutralized. The acid content AC in mmol/g of polymer is calculated from the formula $$\left(\frac{z*m}{(M_{WA}*m + M_{WB}*n + M_{WC}*o)}\right)*1000,$$

where z corresponds to the number of protons which the acid unit A of formula (I) is able to give up. Thus for example, z=1 in the case of a monocarboxylic acid, and z=2 if the acid unit A of formula (I) is a dicarboxylic acid, $M_w$ is the molecular weight of the acid or structural unit(s), for example, $M_{WA}$=72 g/mol if the acid unit A of formula (I) is an acrylic acid. The indices m, n, and o are the figures in mol %, thus m describes the proportion of the acid unit A of formula (I) in mol % in polymer P, n describes the proportion of the structural unit B of formula (II) in mol % in polymer P, and o describes the proportion of the optionally included structural unit C in mol % in polymer P.

The polymer P preferably includes
a) at least one acid unit A of formula (I):

b) at least one structural unit B of formula (II);

and optionally
c) at least one additional structural unit C.

$R^1$ and $R^2$ each independently stand for H, COOM, $CH_2COOM$, or an alkyl group with 1 to 5 carbon atoms, in particular for H; $R^3$ each independently stands for H, $CH_3$, COOM or $CH_2COOM$, in particular for H; and $R^4$ each independently stands for a radical of carboxylic acid, sulfonic acid, methylsulfonic acid, arylsulfonic acid, carbonylamido methylpropanesulfonic acid, phosphoric acid, or phosphonic acid or salts thereof. $R^4$ stands in particular for COOM; or $R^3$ can form a ring with $R^4$, to form —CO—O—CO—.

M means H, alkali metal, alkaline earth metal, or other divalent or trivalent metal atoms, ammonium, alkylammonium, or a mixture thereof. M can represent in particular H, Na, Ca/2, Mg/2, $NH_4$ or an organic ammonium. It is clear to the person skilled in the art that for polyvalent ions, another counterion must be present, which inter alia can also be a carboxylate of the same or another polymer P molecule.

The ammonium compounds are in particular tetraalkylammonium or else $HR_3N$, where R represents an alkyl group, in particular a $C_1$ to $C_6$ alkyl group, preferably ethyl or butyl. Ammonium ions are in particular obtained by neutralization of the carboxyl group with commercially available tertiary amines.

Examples of suitable acid units A are units which are formed by polymerization of acrylic acid, methacrylic acid, mesaconic acid, citraconic acid, glutaconic acid, fumaric acid, maleic acid, maleaminic acid, itaconic acid, vinylbenzoic acid, crotonic acid, vinylsulfonic acid, allylsulfonic acid, methallylsulfonic acid, 2-acrylamido-2-methylpropane-sulfonic acid, or vinylphosphonic acid, or derivatives or analogs thereof such as, for example, maleic acid hemiamide from maleic acid and sulfanilic acid, in particular the N-(4-sulfophenyl)maleic acid amide. Monocarboxylic acids are preferred. Particularly suitable as acid unit A is a unit formed by polymerization of an acrylic acid unit or a salt thereof.

The at least one acid unit A of formula (I) is preferably partially or completely neutralized. The acid unit can be present as free acid or as the salt or the partial salt, where the term "salt" here and in the following also includes (besides classical salts that are obtained by neutralization with a base) chemical complexes between metal ions and carboxylate or carboxyl groups as ligands.

Especially preferred is a polymer P for which $R^1$, $R^2$, and $R^3$ stand for H, $R^4$ stands for COOM, and M stands for H or an alkali metal or an alkaline earth metal. The acid unit A of formula (I) therefore preferably represents an acrylic acid unit or salts thereof.

$R^6$ each independently stand for H, $CH_3$, COOM, or $CH_2COOM$ or a substituent defined as for $R^5$, preferably for H.

$R^5$ each independently stands for a radical of formula (III)

$$-(CH_2)_x-R^7-(R^8O)_y-R^9 \qquad (III)$$

At the same time, $R^7$ stands for an ester, amide, or imide linkage, preferably for —COO— or —CO—NH—. $R^8$ stands for a $C_2$-$C_6$ alkylene group, preferably for a $C_2$-$C_4$ alkylene group or a mixture of $C_2$, $C_3$, and/or $C_4$ alkylene groups in any order; and $R^9$ stands for H, a $C_1$-$C_{12}$ alkyl or cycloalkyl radical, a $C_7$-$C_{20}$ alkylaryl or aralkyl radical, or a substituted or unsubstituted aryl radical, or a monovalent organic radical with 1 to 30 C atoms, which optionally contains hetero atoms.

The subscript x each independently has the value 0 or 1; and y each independently stands for the value 40-250, preferably 60 to 120.

In a preferred embodiment, $R^5$ stands for —COO($R^8O)_y$—$R^9$ or —CO—NH—($R^8O)_y$—$R^9$, in particular for —COO—($R^8O)_y$—$R^9$, and —($R^8O)_y$— stands for a $C_2$-$C_4$ polyoxyalkylene group, in particular for a polyoxyethylene group or a polyoxypropylene group or mixtures of oxyethylene and oxypropylene units in any possible sequence, for example, in a random, alternating, or block manner, and y stands for 40 to 250, preferably for 45 to 120. For a preferred polymer P, at least 30 mol %, especially preferably 50-100 mol %, even more preferably 80-100 mol %, most preferably 100 mol % of structural unit B of formula (II) is represented by a structure where $R^8$ represents a $C_2$ alkylene group. That is, $R^5$ preferably includes at least 30 mol % ($C_2H_4O$) units, preferably 50 to 100 mol % ($C_2H_4O$) units, even more preferably 80 to 100 mol % ($C_2H_4O$) units, relative to the total molar amount of all ($R^8O$) units. $R^5$ particularly preferably includes 100 mol % ($C_2H_4O$) units, relative to the total molar amount of all ($R^{8O}$) units. Depending on the synthesis method for polymer P, $R^9$ can stand for H, a $C_1$-$C_{12}$ alkyl or cycloalkyl radical, a $C_7$-$C_{20}$ alkylaryl or aralkyl radical, or a substituted or unsubstituted aryl radical, or a monovalent organic radical with 1 to 30 C atoms, which optionally includes hetero atoms.

If polymer P is synthesized via a polymer analog reaction, $R^9$ is preferably a methyl radical, and does not stand for a hydrogen atom.

The additional structural unit C can include an additional ether, ester, amide, or imide unit, preferably an amide or ester unit. For example, the additional structural unit C can include carboxylic acid, sulfonic acid, phosphoric acid, phosphonic acid, carbonylamido methylpropanesulfonic acid and alkali metal or alkaline earth salts thereof, poly(oxyalkylene)oxycarbonyl, poly(oxyalkylene)aminocarbonyl, poly(oxyalkylene)oxyalkyl, poly(oxyalkylene)oxy, hydroxyethyl oxycarbonyl, acetoxy, phenyl, or N-pyrrolidonyl groups. The additional structural unit C preferably includes polyoxyalkylene groups, preferably polyoxyethylene groups, polyoxypropylene groups, or mixtures thereof. For example, the structural unit C can be an ester unit which is synthesized by reaction of a monocarboxylic acid or dicarboxylic acid with an alkyl alcohol, in particular a $C_6$-$C_{20}$ alkyl alcohol.

It has been shown that a surprisingly good plasticizing effect is achieved in gypsum compositions if the polymer P has long side chains with a molecular weight $M_w$ of at least 1800 g/mol as well as an acid content of 1.5 to 4, preferably 1.7 to 3.5 mmol acid groups per gram of polymer.

An especially preferred polymer P includes or consists of
a) at least one acid unit A of formula (I');

and
b) at least one structural unit B of formula (II');

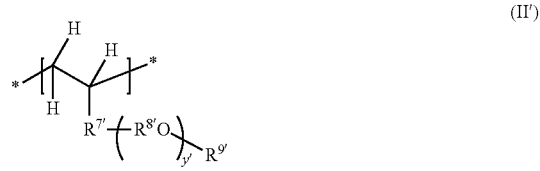

where M' represents H, Na, Ca/2, Mg/2, $NH_4$ or an organic ammonium, preferably an H, where $R^{7'}$ stands for COO or CONH, where $R^{8'}$ stands for an ethylene group, where $R^{9'}$ stands for a $C_1$ to $C_{12}$ alkyl group, preferably for a methyl group, where y' stands for 40-250, preferably 60 to 100, and where the acid content is 1.5 to 4, preferably 1.7 to 3.5 mmol COOM' per gram of polymer.

The polymer P can have a combination of different structural units for the respective structural units A, B, and optionally C. For example, several mixed structural units A can be present in polymer P, for example, a mixture of methacrylic acid units and acrylic acid units. But purely acrylic acid units are preferred. Or there can be several different mixed ester or amide units B in polymer P, for example, several ester units B with different substituents $R^{8'}$. For example, the combined use of polyalkylene glycols, in particular polyethylene glycols together with polypropylene glycols, or the combined use of polyalkylene glycols, in particular polyethylene glycols, of different molecular weights is preferred.

In a preferred embodiment, polymer P includes 50 to 99.5 mol %, preferably 70 to 99 mol % of acid unit A of formula (I), 0.5 to 50 mol %, preferably 1 to 30 mol % of structural unit B of formula (II), and optionally 0 to 49 mol % of structural unit C, respectively relative to the total molar amount of structural units A, B, and C in polymer P.

Preferably acid unit A of formula (I) is an acid unit of formula (I'), where the structural unit B of formula (II) is a structural unit of formula (II') and structural unit C of formula (III) is a structural unit of formula (III').

Polymer P especially preferably includes 75 to 98 mol %, even more preferably 85 to 98 mol % of acid unit A of formula (I), 2 to 25 mol %, even more preferably 2 to 15 mol % of structural unit B of formula (II), and optionally 0 to 23 mol % of structural unit C, respectively relative to the total molar amount of structural units A, B, and C in polymer P. Preferably acid unit A of formula (I) is an acid unit of formula (I'), structural unit B of formula (II) is a structural unit of formula (II'), and structural unit C of formula (III) is a structural unit of formula (III').

The sequence of individual structural units A, B, and C in polymer P can be alternating, statistical, in blocks, or random.

The polymer P preferably has a molecular weight $M_w$ in the range from 10 000-150 000 g/mol, preferably 15 000-100 000 g/mol, especially preferably 25 000-80 000 g/mol.

The polymer P can be synthesized in different ways. Essentially two methods are used. In a first method, the polymers are synthesized in a "polymer analog reaction" from a polycarboxylate and the respective alcohols and/or amines. In a second method, the polymers are synthesized from the respective unsaturated carboxylic acid-functional and ester-functional and/or amide-functional monomers by free-radical polymerization.

Especially preferred polymers are synthesized according to the polymer analog reaction as specified by the first method.

The polymer analog reaction has the great advantage that very different comb polymers with very different properties can be obtained simply and reliably from commercially available polymers derived from α-β-unsaturated acids, in particular from monocarboxylic or dicarboxylic acids, especially from poly(meth)acrylic acids, by varying the amount, the type, and the ratio of alcohol and amine. Such polymer analog reactions are described, for example, in WO97/35814A1, WO95/09821A2, DE 100 15 135A1, EP 1138697A1, EP1348729A1 and WO2005/090416A1. Details about the polymer analog reaction are disclosed, for example, in EP 1 138 697 B1 on page 7, line 20 to page 8, line 50, as well as in its Examples, or in EP 1 061 089 B1 on page 4, line 54 to page 5, line 38 as well as in its Examples. Polymer P can also be obtained in a solid aggregate state, as described in EP 1 348 729 A1 on page 3 to page 5 as well as in its Examples.

It is thus preferable to use a polymer P where the polymer P can be obtained by reaction of (a) at least one polycarboxylic acid or a polycarboxylic acid analog; and (b) at least one monohydroxy compound E and/or at least one monoamine compound F including at least one polyoxyalkylene group, and optionally (c) at least one additional compound D.

"Polycarboxylic acid or a polycarboxylic acid analog" means a homopolymer or copolymer which can be obtained by polymerization of at least one monomer a and optionally at least one monomer b. Monomer a is selected from the group including unsaturated monocarboxylic acids, unsaturated dicarboxylic acids, their analogs and their mixtures. Unsaturated monocarboxylic acids or dicarboxylic acids preferably include maleic acid, itaconic acid, fumaric acid, citraconic acid, glutaconic acid, mesaconic acid, or crotonic acid, in particular acrylic acid or methacrylic acid. "Analog of a monocarboxylic acid or dicarboxylic acid or polycarboxylic acid" in terms of the present invention means acid salts, acid halides, acid anhydrides, and acid esters, in particular alkyl acid esters.

Monomer b is preferably selected from the group of ethylenically unsaturated monomers including α-,β-unsaturated monocarboxylic or dicarboxylic acids, α-,β-unsaturated monocarboxylic or dicarboxylic acid esters, α-,β-unsaturated carboxylates, styrene, ethylene, propylene, vinyl acetate, in particular methacrylic acid, acrylic acid, crotonic acid, itaconic acid, maleic acid, fumaric acid, as well as their salts, esters, and mixtures thereof.

The preferred copolymer is a copolymer of acrylic acid and methacrylic acid as well as their salts or partial salts.

The preferred homopolymer is polyacrylic acid and salts or partial salts thereof.

The polycarboxylic acid or the analog of the polycarboxylic acid here can be present as free acid or as the partial salt, where the term "salt" here and in the following also includes (besides classical salts such as are obtained by neutralization with a base) chemical complexes between metal ions and the carboxylate or carboxyl groups as ligands. In synthesis of the polycarboxylic acid or the polycarboxylic acid analog, optionally used initiators, co-initiators, and polymerization controllers should be selected in such a way that there are preferably no reactive hydroxyl or amine functional groups present in polymer P.

"Monohydroxy compound" here and in the following means a substance that has only one free hydroxyl group.

"Monoamine compound" here and in the following means a substance that has only one free amino group.

The homopolymer or copolymer of the polycarboxylic acid or polycarboxylic acid analog is obtained by free-radical polymerization according to conventional methods. The polymerization can be carried out in a solvent, preferably in water, or in the substance. This free-radical polymerization preferably is carried out in the presence of at least one molecular weight controller, in particular an inorganic or organic sulfur compound such as, for example, mercaptans, or a phosphorus compound.

The polymerization is advantageously carried out under conditions such that the homopolymer or copolymer is constructed from 10 to 250, preferably 20 to 100, more preferably 25 to 60 monomer components. Such homopolymers or copolymers of (meth)acrylic acid are commercially available. The homopolymer or copolymer of polycarboxylic acid or polycarboxylic acid analog preferably has a molecular weight $M_w$ of 500 to 20 000 g/mol, preferably 2000 to 10 000 g/mol, particularly preferably 3500 to 6500 g/mol.

The monohydroxy compound E is preferably endcapped on one end by terminal groups that are not reactive under ordinary reaction conditions. This is preferably a polymer with a polyalkylene glycol scaffolding. The monohydroxy compound E has formula (IV)

$$\text{HO—}(R^{8''}O)_{y'}\text{—}R^{9''} \qquad (IV)$$

where $R^{8''}$ each independently means a $C_2$-$C_4$ alkylene group with a sequence of ($R^{8''}$O) units in any possible order; where $R^{9''}$ stands for a $C_1$-$C_{12}$ alkyl or cycloalkyl radical, a $C_7$-$C_{20}$ alkylaryl or aralkyl radical, or a substituted or unsubstituted aryl radical, or a monovalent organic radical with 1 to 30 C atoms, which optionally includes hetero atoms; and where y" each independently stands for 40-250, preferably 45 to 120.

Preferred monohydroxy compounds E of formula (IV) have a methyl, ethyl, i-propyl, or n-butyl group, in particular a methyl group, as substituent $R^{9''}$. $R^8$ each independently stands for a $C_2$ alkylene group and/or a $C_3$ alkylene group. E is preferably a mixed polymer derived from ethylene oxide/propylene oxide, more preferably polyethylene glycol endcapped on one end.

Mixtures of several different compounds in group E are likewise possible. Thus, for example, polyethylene glycols endcapped on one end and having different molecular weights can be mixed or, for example, mixtures can be used of polyethylene glycols endcapped on one end and ethylene oxide/propylene oxide copolymers endcapped on one end or polypropylene glycols endcapped on one end.

"Endcapped with terminal groups that are not reactive under ordinary reaction conditions" in terms of the invention means that instead of functional groups that are reactive in esterification or amidation, such groups are present which are no longer capable of reacting. Ordinary reaction conditions are those which are familiar to the person skilled in the art for esterification and amidation. For "compounds endcapped on one end," only one end is no longer capable of reaction.

In a preferred embodiment, the monohydroxy compound E is a polyalkylene glycol endcapped on one end with a molecular weight $M_w$ of 1800 to 10 000 g/mol, in particular 2000 to 8000 g/mol, preferably 2000 to 6000 g/mol. A mixture of polyalkylene glycols with different molecular weights and endcapped on one end is also suitable, for example, the mixture of polyalkylene glycols with a molecular weight with a molecular weight of 1000 g/mol and polyalkylene glycols with a molecular weight of 5000 g/mol.

In addition to monohydroxy compound E or instead of monohydroxy compound E, a monoamine compound F can be used in the first method. Formation of amide groups thereby occurs.

Typical examples of such monoamine compounds F can be represented by formula (V):

$$NH_2-(R^8O)_y-R^9 \quad (V)$$

The substituents $R^8$ and $R^9$ or the subscript y each independently have the same meanings as already defined for formula (III).

Examples of such monoamine compounds F are (α-methoxy-ω-amino)polyoxyethylene, (α-methoxy-ω-amino)polyoxypropylene, (α-methoxy-ω-amino) oxyethylene/oxypropylene copolymer.

Especially preferred as monoamine compounds F are α-methoxy-ω-amino) oxyethylene/oxypropylene copolymers such as, for example, Jeffamine® M-2070, or (α-methoxy-ω-amino)polyoxyethylene, as well as other monoamines which are marketed, for example, by Huntsman under the name Jeffamine® of the M series, as well as mixtures thereof. (α-Methoxy-ω-amino)oxyethylene/oxypropylene copolymers are most preferred. Such monoamine compounds F can be obtained, for example, from alcohol-initiated polymerization of ethylene and/or propylene oxide, from conversion of the terminal alcohol group to an amine group.

Preferred as additional compound D is a compound which can enter into reaction with the polycarboxylic acid or the polycarboxylic acid analog. Examples of a compound D are additional amines or alcohols, for example a $C_6$-$C_{20}$ alkyl alcohol or an additional monoamine or diamine. Several different compounds D can also be used.

Reaction of the polycarboxylic acid or the polycarboxylic acid analog with at least one monohydroxy compound E and/or with at least one monoamine compound F and optionally a compound D to form a polymer P is typically carried out, in the polymer analog reaction, so that the at least one monohydroxy compound E and/or the at least one monoamine compound F is added with stirring to the polycarboxylic acid or the polycarboxylic acid analog and the mixture is heated to the reaction temperature.

Stirring of the mixture is continued and the reaction is carried out optionally under vacuum or by passing a stream of gas over or through the reaction mixture. The temperature for this reaction is, for example, between 140° C. and 200° C. But the reaction is also possible at temperatures between 150° C. and 175° C. If, in addition to monohydroxy compound E, a monoamine compound F is used, it can be added at the same time as monohydroxy compound E or else at a later time during this reaction step.

In a preferred embodiment, this reaction is carried out in the presence of an esterification catalyst, in particular an acid. Such an acid is preferably sulfuric acid, p-toluenesulfonic acid, benzenesulfonic acid, methanesulfonic acid, phosphoric acid, or phosphorous acids. Sulfuric acid is preferred. Water can be removed from the reaction mixture under atmospheric pressure but also under vacuum. A gas stream can also be passed over or through the reaction mixture. Air or nitrogen can be used as the gas stream.

The reaction can be monitored by measuring the acid value, for example by titration, and the reaction can be stopped at a desired acid value (and thus at the desired acid content). The reaction is stopped by breaking the vacuum and cooling down.

In a preferred embodiment, a polyacrylic acid is esterified with a polyethylene glycol, endcapped on one end by a methyl group, and/or is reacted with a monoamine.

In the "polymer analog" reaction, besides ester groups and optionally amide groups, anhydride groups can also be formed, which in a second step can be completely or partially reacted with an amine compound to form an amide.

Such methods are described, for example, in WO2005/090416A1.

In a second synthesis method, the polymer P is synthesized via free-radical polymerization. The free-radical polymerization route is the most common method, but it is made more difficult for special compounds because of the commercial availability of the corresponding monomers and the need for expensive process control.

The invention thus additionally relates to use of a polymer P as a dispersant, in particular as a plasticizer, for gypsum compositions, where the polymer P can be obtained by the polymerization reaction in the presence of at least one radical former from (a) at least one ethylenically unsaturated monomer MM, which is selected from the group consisting of unsaturated monocarboxylic or dicarboxylic acids, unsaturated sulfonic acids, unsaturated phosphoric acids, unsaturated phosphonic acids or their salts; with (b) at least one ethylenically unsaturated carboxylic acid derivative H of formula (VI);

(VI)

and optionally (c) at least one additional ethylenically unsaturated compound L.

The substituents $R^1$, $R^2$, $R^5$, and $R^6$ each independently have the same meanings as already described for formula (II).

The ethylenically unsaturated monomer MM is preferably a monocarboxylic or dicarboxylic acid or the salt of the unsaturated monocarboxylic or dicarboxylic acid.

The monocarboxylic or dicarboxylic acid is preferably methacrylic acid, maleic acid, itaconic acid, fumaric acid, citraconic acid, glutaconic acid, mesaconic acid, or crotonic acid, in particular acrylic acid or methacrylic acid. Acrylic acid is especially preferred.

The at least one ethylenically unsaturated carboxylic acid derivative H of formula (VI) is preferably a carboxylic acid ester or a carboxylic acid amide, especially preferably an acrylic acid ester or a methacrylic acid ester. Preferred examples of such esters are polyalkylene glycol acrylates. Several monomers of formula (VI) with different substituents $R^5$ can be used together in combination. For example, the combined use of polyalkylene glycols, in particular polyethylene glycols of different molecular weights, is preferred. Examples of suitable carboxylic acid amides can be amides derived from ethylenically unsaturated monocarboxylic or dicarboxylic acids and amine compounds. Especially preferred are amides of (meth)acrylic acid, preferably the polyoxyalkylene monoamides. Especially preferred amide monomers are the alkyl polyalkylene glycol (meth)acrylamides, especially preferably the methyl polyethylene glycol (meth)acrylamides, the methyl polyethylene glycol/polypropylene glycol (meth)acrylamides, or the methyl polypropylene glycol (meth)acrylamides. One or more of these unsaturated carboxylic acid amides can be used.

The additional ethylenically unsaturated compound L is preferably a carboxylic acid ester or amide, especially preferably an acrylic acid ester or amide, or a methacrylic acid ester or amide. Examples of such esters or amides are polyoxyalkylene (meth)acrylates. Several different compounds L can also be used together in combination. For example, monohydroxyethyl or dihydroxyethyl (meth)acrylamide, monohydroxypropyl or dihydroxypropyl (meth)acrylamide, monocyclohexyl or dicyclohexyl (meth)acrylamide, or N-alkyl-N-hydroxyethyl (meth)acrylamides, or N-alkyl-N-hydroxypropyl (meth)acrylamides are suitable.

For the use according to the invention, the polymer P can be used in both liquid and solid form as well as alone or as a component of a dispersant, in particular a plasticizer.

For the use according to the invention, the polymer P can thus be used as a dispersant for gypsum compositions as a simple polymer P or as mixtures of several polymers P. Polymers P can also be used with other dispersants or mixtures of dispersants. For the use according to the invention, the polymers P or mixtures containing polymers P can contain other components. Examples of other components are solvents or additives such as other plasticizers, for example, lignosulfonates, sulfonated naphthalene/formaldehyde condensates, sulfonated melamine/formaldehyde condensates, or polycarboxylate ethers (PCE), accelerators, retarders, shrinkage reducers, defoamers, or foaming agents.

Depending on the synthesis method or how the reaction is carried out, the dispersant furthermore can contain, in addition to the polymer P, free compounds of the starting material, in particular free monohydroxy compounds such as, for example, polyalkylene glycol, in particular free polyethylene glycol.

If the polymer P is used in liquid form, preferably a solvent is used for the reaction. Preferred solvents are, for example, alcohols, in particular ethanol or isopropanol, and water, where water is the most preferred solvent.

The polymer P can also be present in a solid aggregate state. In terms of the invention, "polymers in a solid aggregate state" means polymers that at room temperature are in a solid aggregate state and are, for example, powders, flakes, pellets, granulates, or sheets and in this form can be easily transported and stored.

The polymer P is preferably used in an amount of 0.01 to 10 wt. %, relative to the weight of the binder, in order to achieve the desired effect in the gypsum composition. Several mixed polymers P can also be used in order to achieve the desired effect.

In another aspect, the present invention relates to a binder containing a mixture including gypsum and at least one polymer P. The polymer P has already been described above.

The term "gypsum" refers to any known form of gypsum, in particular calcium sulfate dihydrate, calcium sulfate α-hemihydrate, calcium sulfate β-hemihydrate, or calcium sulfate anhydrite. Polymer P is especially suitable for use in a binder containing a mixture including calcium sulfate β-hemihydrate for use in gypsum plasterboard panels, in particular gypsum cardboard panels.

The binder containing the mixture contains at least 30 wt. %, preferably at least 50 wt. %, most preferably at least 70 wt. % gypsum, in particular calcium sulfate β-hemihydrate, relative to the total weight of the binder. The binder can contain other hydraulic-setting materials such as, for example, cement, in particular Portland cement or high-alumina cement and respectively their mixtures with fly ash, silica fume, slag, granulated slag, and limestone filler or quicklime.

The mixture can furthermore contain other additives such as, for example, fibers, as well as additives of conventional components such as, for example, other plasticizers, for example, lignosulfonates, sulfonated naphthalene/formaldehyde condensates, sulfonated melamine/formaldehyde condensates, or polycarboxylate ethers (PCE), accelerators, retarders, starch, sugar, silicones, shrinkage reducers, defoamers, or foaming agents.

Especially preferred is a binder containing a mixture including a polymer P, calcium sulfate β-hemihydrate, and at least one accelerator, as well as other additives such as are customary for manufacture of a gypsum plasterboard panel.

In another aspect, the present invention relates to a method for preparation of a binder containing a mixture where the at least one polymer P is added to the binder separately or as a premixed additive in solid or liquid form.

The polymer P in the solid aggregate state can be a component of a gypsum composition, a "dry mix", that can be stored for a long time and is typically used packed in sacks or stored in silos. Such a dry mix is also usable after prolonged storage times and has good pourability.

The polymer P can also be added to a conventional gypsum composition with or shortly before or shortly after addition of water. Addition of the polymer P in the form of an aqueous solution or dispersion, in particular as mixing water or as part of the mixing water, has been shown to be especially suitable for this. The aqueous solution or dispersion is prepared by adding water during synthesis of polymer P or by later mixing of polymer P with water. For this purpose, the proportion of polymer P is typically 10 to 90 wt. %, in particular 20 to 50 wt. %, relative to the weight of the aqueous solution or dispersion. Depending on the type of polymer P, a dispersion or a solution forms. A solution is preferred.

The aqueous solution or dispersion can contain other components. Examples of this are solvents or additives, such as are commonly used in construction chemistry, in particular surfactants, heat and light stabilizers, dyes, defoamers, accelerators, retarders, and foaming agents.

The polymer P has especially good properties as a dispersant, in particular as a plasticizer, for gypsum compositions, in particular for compositions including calcium sulfate β-hemihydrate for use in gypsum plasterboard panels.

That is, the resulting mixture has significantly better flow behavior than a composition without the dispersant, without markedly slowing down setting. The flow behavior is typically measured by the spread diameter. Secondly, mixtures can be achieved which for the same flow behavior require considerably less water, so the mechanical properties of the cured gypsum composition are greatly improved, and an improvement is achieved in the process for manufacture of gypsum compositions, in particular gypsum plasterboard panels, since, for example, time and energy can be saved in drying the gypsum plasterboard panels.

The polymer P thus has excellent properties as a dispersant, in particular as a plasticizer, in systems which contain predominantly sulfate binders, in particular predominantly calcium sulfate β-hemihydrate. Furthermore, with polymer P, the compositions might not be discolored.

EXAMPLES

The invention will now be explained in more detail with the help of Examples.
1. Polymer P Used

TABLE 1

| Abbreviation | Meaning | Mw* |
| --- | --- | --- |
| PEG1000 | Polyethylene glycol with no terminal OH groups | 1000 g/mol |
| PEG3000 | Polyethylene glycol with no terminal OH groups | 3000 g/mol |
| PEG5000 | Polyethylene glycol with no terminal OH groups | 5000 g/mol |
| EO/PO(70/30)2000 | Block copolymer of ethylene oxide and propylene oxide in 70:30 ratio with no terminal OH groups | 2000 g/mol |

Abbreviations used. Mw = average molecular weight page 7, line 20 to page 8, line 50, as well as in its Examples, or in EP 1 061 089 B1 on page 4, line 54 to page 5, line 38 as well as in its Examples.

For example, polymer P-2 was synthesized by a polymer analog reaction as follows:

145 g of a 40-percent aqueous solution (corresponding to about 1 mole of acid units) of polyacrylic acid (PAS, with an average molecular weight $M_w$ of about 5000 g/mol) were added to a round-bottomed flask with a mechanical stirrer (IKA® stirrer), thermometer, gas inlet tube, and distillation bridge. The mixture was heated to 50° C., and 300 g polyethylene glycol monomethyl ether (MPEG, with average molecular weight M, of about 5000 g/mol) and 4 g Jeffamine® M-2070 were added. The reaction mixture was heated to 175° C. under a stream of $N_2$.

The water contained in the mixture as well as the water produced in the reaction were continuously distilled off under the stream of $N_2$. When the temperature was reached, 3 g of a 66% potassium acetate solution was added to the reaction mixture and a vacuum of 80 mbar was established. The reaction was run to completion in 2½ hours. The polymer melt was allowed to solidify or else after cooling to <100° C., 550 g of water was added to obtain a 40% polymer solution.

The polymers P-1 and P-3 as well as the Comparison Examples V1-V3 were synthesized in the same way as polymer P-2.

Comparison Example V-4 is a commercially available melamine-based plasticizer (for example, Melment® F15G from BASF). Comparison Example V-5 is a commercially available naphthalene sulfonate-based plasticizer (for example, Superplastyfikator CA4O from PCC Rokita SA, Poland). No plasticizer was used for the sixth Comparison Example.

TABLE 2

Polymers according to the invention P-1, P-2, and P-3 or comparison polymers V-1 to V-3 contain the structural units A of formula (I) and the structural units B of formula (II) with $R^2$ = H, $R^3$ = H, $R^4$ = COOM, $R^6$ = H, M = H$^+$, Na$^+$;

| No. | $R^1$ | $R^5$ | | Mw | mol % | AC, mmol/gram polymer |
| --- | --- | --- | --- | --- | --- | --- |
| P-1 | —H | —COO-PEG1000-CH$_3$: —COO-PEG5000-CH$_3$: —CO—NH—EO/PO(70/30)2000-CH$_3$ | 41: 57.4: 1.6* | 50 000 | m = 87.8 n = 12.2 o = 0 | 1.845 |
| P-2 | —H | —COO-PEG5000-CH$_3$: | | 44 000 | m = 94.0 n = 6.0 o = 0 | 2.527 |
| P-3 | —H | —CO—NH—EO/PO(70/30)2000-CH$_3$: | | unk | m = 87.83 n = 12.17 o = 0 | 2.711 |
| V-1 | —H | —COO-PEG1000-CH$_3$: —CO—NH—EO/PO(70/30)2000-CH$_3$ | 98.4: 1.6* | 31 500 | m = 87.8 n = 12.2 o = 0 | 4.480 |
| V-2 | —H | —COO-PEG3000-CH$_3$: —CO—NH—EO/PO(70/30)2000-CH$_3$ | 99.5: 0.5* | 57 000 | m = 63.8 n = 36.2 o = 0 | 0.552 |
| V-3 | —H | —COO-PEG1000-CH$_3$: —CO—NH—EO/PO(70/30)2000-CH$_3$ | 99.5: 0.5* | 37 000 | m = 63.8 n = 36.2 o = 0 | 1.463 |

AC = acid content
*means mole ratio of the different $R^5$ side chains
unk means unknown The polymers P-1, P-2, and P-3 as well as the Comparison Examples V1, V2, and V3 given in Table 2 were synthesized by a polymer analog reaction from polyacrylic acid and the corresponding alcohols and/or amines according to a method known in the prior art. Details about the polymer analog reaction are disclosed, for example, in EP 1 138 697 B1 on 2. Flow Behavior in Calcium Sulfate β-Hemihydrate For a gypsum slurry, 140 g water with 1 g of a 40% plasticizer solution (corresponding to 0.2 wt. % plasticizer, relative to the total weight of the calcium sulfate β-hemihydrate) was added. Then 200 g calcium sulfate β-hemihydrate, optionally containing 0.2 g (0.1 wt. %, relative to the total weight of the calcium sulfate 3-hemihydrate) of a calcium sulfate dihydrate accelerator (for example, available from Fluka), or 4 g (2 wt. %, relative to the total weight of calcium sulfate β-hemihydrate) of a potassium sulfate accelerator (Fluka) was sprinkled into the water over a 15 second period, and the gypsum slurry was allowed to soak for 15 seconds. Then it was vigorously stirred by hand for 30 seconds. The minicone of diameter 50 mm and height 51 mm was filled, and after 75 seconds the spread diameter was determined in millimeters. The diameter of the gypsum cake formed was measured as soon as flow was no longer observed. The diameter in mm was called the spread diameter. The beginning of stiffening and the end of stiffening were determined by the knife-cut method according to DIN EN 13279-2 and the thumb pressure method. The beginning of stiffening is reached if after a knife cut through the gypsum cake, the edges of the cut no longer heal.

The end of stiffening occurs when water no longer escapes from the gypsum cake when finger pressure of about 5 kg is applied.

TABLE 3

Spread diameter in mm and beginning/end of stiffening in minutes (mm) and seconds (sec).

| Plasticizer | Accelerator | Begin stiffening (min:sec) | End stiffening (min:sec) | Spread diameter 2 min |
|---|---|---|---|---|
| none | — | 07:55 | 18:50 | 154 |
| P-1 | — | 13:47 | 34:25 | 196 |
| P-2 | — | 15:42 | 40:00 | 198 |
| P-3 | — | 19:00 | 43:00 | 186 |
| V-1 | — | 43:30 | 79:20 | 169 |
| V-2 | — | 07:40 | 19:20 | 146 |
| V-3 | — | 11:25 | 27:40 | 173 |
| V-4 | — | 07:55 | 20:30 | 172 |
| V-5 | — | 07:20 | 18:20 | 176 |
| none | CaSO$_4$•2H$_2$O | 02:00 | 05:00 | 93 |
| P-1 | CaSO$_4$•2H$_2$O | 03:49 | 09:30 | 177 |
| P-2 | CaSO$_4$•2H$_2$O | 03:45 | 09:27 | 175 |
| P-3 | CaSO$_4$•2H$_2$O | 04:00 | 10:20 | 170 |
| V-1 | CaSO$_4$•2H$_2$O | 09:15 | 15:55 | 170 |
| V-2 | CaSO$_4$•2H$_2$O | 02:00 | 05:55 | 97 |
| V-3 | CaSO$_4$•2H$_2$O | 03:00 | 07:75 | 164 |
| V-4 | CaSO$_4$•2H$_2$O | 02:15 | 05:55 | 125 |
| V-5 | CaSO$_4$•2H$_2$O | 02:10 | 06:00 | 140 |
| none | K$_2$SO$_4$ | 01:50 | 03:50 | 132 |
| P-1 | K$_2$SO$_4$ | 04:00 | 08:00 | 200 |
| P-2 | K$_2$SO$_4$ | 05:10 | 10:00 | 204 |
| V-1 | K$_2$SO$_4$ | 08:40 | 13:30 | 168 |
| V-2 | K$_2$SO$_4$ | 02:15 | 05:00 | 142 |
| V-3 | K$_2$SO$_4$ | 03:40 | 07:00 | 182 |
| V-4 | K$_2$SO$_4$ | 02:00 | 04:00 | 150 |
| V-5 | K$_2$SO$_4$ | 02:00 | 04:20 | 166 |

Table 3 shows that in the pure calcium sulfate β-hemihydrate gypsum slurry, the spread diameter and thus the workability and the flowability are very good for gypsum compositions containing the polymers P-1, P-2, and P-3 according to the invention. In order to better meet practical requirements, a gypsum composition generally contains an accelerator. It is therefore in particular the Examples with the accelerator that are of interest.

The compositions according to the invention with polymers P1 to P3 thus have clearly better flow behavior than the Comparison Examples, without slowing down the beginning or the end of stiffening too much.

Comparison Example V-1 contains a polymer with only short side chains of 1000 g/mol. Comparison Example V-2 contains a polymer with too low an acid content, and Comparison Example V-3 contains a polymer with a low acid content and short side chains. All these properties lead to a reduced spread diameter in a calcium sulfate β-hemihydrate composition. Also for conventional plasticizers (Melment, V-4 and naphthalene sulfonate, V-5), in particular the spread diameter is reduced compared with the polymers used according to the invention.

Of course, the invention is not limited to the exemplary embodiments shown and described. It is understood that the above-indicated features of the invention can be used not only in the combination given in each case, but also in other modifications, combinations, and alterations or in isolation, without going beyond the scope of the invention.

The invention claimed is:

1. A gypsum composition comprising:
   a binder comprising at least 30 wt % gypsum relative to a total weight of the binder; and
   a polymer P comprising:
      a main chain containing hydrocarbon groups;
      at least one side chain including at least one acid group, the acid group selected from the group consisting of a carboxylic acid group, a sulfonic acid group, a phosphonic acid group, a phosphoric acid group, and a salt thereof; and
      at least one polyoxyalkylene group, wherein the polyoxylalkylene group is connected to the main chain through a linkage, the linkage including at least one ester, amide, or imide group;
   wherein:
      the polymer P is a dispersant for the gypsum composition; and
      the polymer P has an acid content of 1.8 to 4 mmol acid groups per gram of polymer.

2. The gypsum composition according to claim 1, wherein the gypsum is calcium sulfate β-hemihydrate.

3. The gypsum composition according to claim 1, wherein the acid group is a carboxylic acid group.

4. The gypsum composition according to claim 1, wherein the at least one polyoxyalkylene group is or includes a polyoxyethylene group.

5. The gypsum composition according to claim 1, wherein the acid content of the polymer P is 1.8 to 2.7 mmol acid groups per gram of polymer.

6. The gypsum composition according to claim 1, wherein the polymer P includes:
   a) at least one acid unit A of formula (I):

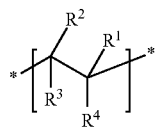

(I)

b) at least one structural unit B of formula (II):

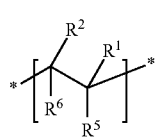

(II)

and optionally
c) at least one additional structural unit C;
wherein:
R$^1$ and R$^2$ are each selected from the group consisting of H, COOM, CH$_2$COOM, and an alkyl group having from 1 to 5 carbon atoms;

$R^3$ is selected from the group consisting of H, $CH_3$, COOM, and $CH_2COOM$;

$R^4$ is a radical selected from the group consisting of carboxylic acid, sulfonic acid, phosphoric acid, and phosphonic acid or a salt thereof; or $R^3$ forms a ring with $R^4$, to form —CO—O—CO—;

M is selected from the group consisting of H, alkali metal, alkaline earth metal, ammonium, ammonium cation, and mixtures thereof;

$R^5$ is a radical of formula MD:

 (III)

where:

$R^7$ is an ester, amide, or imide linkage;

$R^8$ is a $C_2$-$C_6$ alkylene group;

$R^9$ is selected from the group consisting of H, a $C_1$-$C_{12}$ alkyl or cycloalkyl radical, a $C_7$-$C_{20}$ alkylaryl or aralkyl radical, a substituted or unsubstituted aryl radical, and a monovalent organic radical with 1 to 30 C atoms, which optionally includes hetero atoms;

x is 0 or 1; and y is 40-250; and $R^6$ is selected from the group consisting of H, $CH_3$, COOM, $CH_2COOM$, and a substituent as defined for $R^5$.

7. The gypsum composition according to claim 6, wherein $R^1$, $R^2$, $R^3$, and $R^6$ stand for H and $R^4$ stands for COOM.

8. The gypsum composition according to claim 6, wherein x is 0.

9. The gypsum composition according to claim 1, wherein the polymer P is synthesized by a polymer analog reaction of esterification and/or amidation of a polycarboxylic acid.

10. The gypsum composition according to claim 1, wherein the polymer P is synthesized by a free-radical polymerization reaction.

11. The gypsum composition according to claim 6, wherein the polymer P further includes:

50 to 99.5 mol % of acid unit A of formula (I);

0.5 to 50 mol % of structural unit B of formula (II), relative to a total molar amount of structural units A and B in polymer P; and, optionally, 0 to 49 mol % of structural unit C, relative to the total molar amount of structural units A, B, and C in polymer P.

12. A gypsum plasterboard panel comprising the gypsum composition according to claim 1.

13. A binder comprising:

at least 30 wt % gypsum relative to a total weight of the binder; and a polymer P comprising:

a main chain containing hydrocarbon groups;

at least one side chain including at least one acid group, the acid group selected from the group consisting of a carboxylic acid group, a sulfonic acid group, a phosphonic acid group, a phosphoric acid group, and a salt thereof; and at least one polyoxyalkylene group, wherein the polyoxylalkylene group is connected to the main chain through a linkage, the linkage including at least one ester, amide, or imide group;

wherein the polymer P has an acid content of 1.8 to 4 mmol acid groups per gram of polymer.

14. A method for preparing the binder according to claim 13, comprising:

adding polymer P to the gypsum separately or as a premixed additive in solid or liquid form.

15. The binder according to claim 13, wherein the polymer P has an acid content of 1.8 to 2.7 mmol acid groups per gram of polymer.

16. The binder according to claim 13, comprising at least 70 wt % gypsum relative to the total weight of the binder.

17. The binder according to claim 16, wherein the gypsum is calcium sulfate β-hemihydrate.

18. The gypsum composition according to claim 1, wherein the binder comprises at least 70 wt % gypsum relative to the total weight of the binder in the gypsum composition.

19. The gypsum composition according to claim 1, wherein the binder comprises 90 wt % gypsum relative to the total weight of the binder in the gypsum composition, and the gypsum is calcium sulfate β-hemihydrate.

* * * * *